United States Patent
Rike et al.

[11] 3,733,106
[45] May 15, 1973

[54] COMBINATION VALVE ASSEMBLY WITH PROPORTIONER OVERRIDE

[75] Inventors: Richard C. Rike, Dayton; Ronald L. Shellhause, Vandalia, both of Ohio

[73] Assignee: General Motors Corporation, Detroit, Mich.

[22] Filed: Sept. 17, 1970

[21] Appl. No.: 72,992

[52] U.S. Cl. ..................303/6 C, 251/368
[51] Int. Cl. ..............................B60t 13/00
[58] Field of Search ..................303/6 C, 84 A; 200/82 D; 340/52 C; 188/151 A; 251/368

[56] References Cited

UNITED STATES PATENTS

| | | | |
|---|---|---|---|
| 3,441,318 | 4/1969 | Bueler | 303/6 C |
| 3,464,741 | 9/1969 | Falk | 303/6 C |
| 3,556,607 | 1/1971 | Shutt et al. | 303/6 C |
| 2,904,877 | 9/1959 | Edelen | 251/368 X |
| 2,981,514 | 4/1961 | Loxham | 251/368 X |
| 3,480,333 | 11/1969 | Stelzer | 303/6 C |
| 3,572,850 | 3/1971 | Schultz | 303/84 A |
| 3,498,681 | 3/1970 | Bueler | 303/6 C |

Primary Examiner—Evon C. Blunk
Assistant Examiner—Merle F. Maffei
Attorney—W. E. Finken and D. D. McGraw

[57] ABSTRACT

A combination valve assembly for a dual circuit brake system in which a metering valve is in one circuit, a proportioning valve is in the other circuit, and a hydraulically reset pressure loss warning indicator unit is sensitive to both circuits. Actuation of the warning unit because of pressure loss in the metering valve circuit causes the proportioning valve to be overridden by removing one of the valve elements from a proportioning position so that pressure through the valve is not proportioned.

9 Claims, 1 Drawing Figure

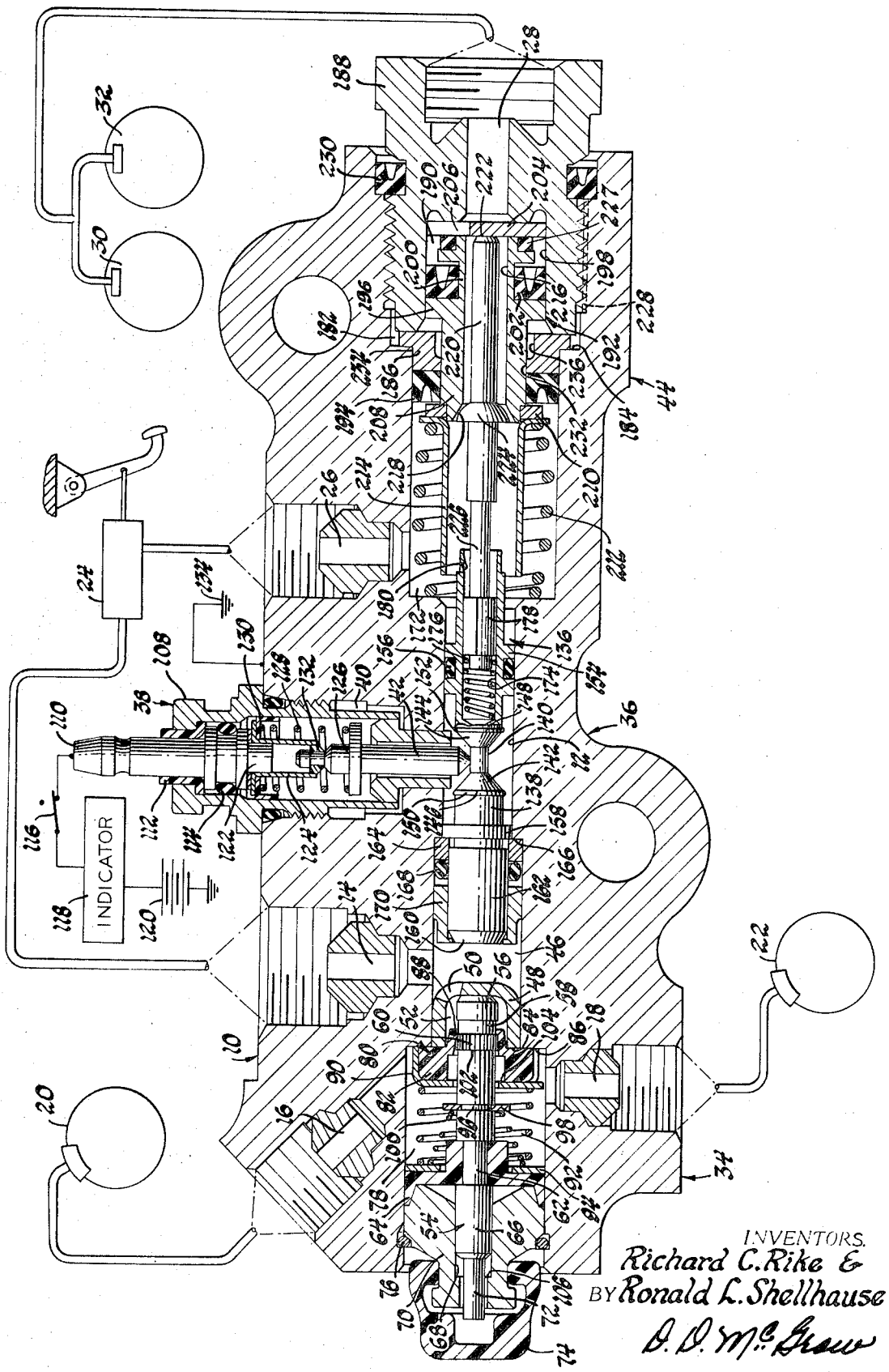

COMBINATION VALVE ASSEMBLY WITH PROPORTIONER OVERRIDE

SUMMARY OF THE INVENTION

The invention relates to a vehicle dual circuit combination valve assembly, and more particularly to one having a pressure loss warning unit and a proportioning valve unit with proportioner override. The override action occurs when pressure loss occurs in the brake circuit not containing the proportioning valve, and in an uncorking type of action in which a normally fixed valve element is moved away and out of proportioning operating range of the movable proportioning valve element to permit direct and unproportional delivery of brake pressure through the proportioning valve. This provides a single, direct acting arrangement in which no by-pass mechanism and passages are required. Pressure continues to follow the same path as before instead of being rerouted through a by-pass. One of the features of the invention is the provision of a lost-motion mechanism as a part of the override arrangement, resulting in better action of the warning unit and the proportioner. Another feature of the invention is the piloting arrangement for one of the proportioner valve elements which reduces concentricity tolerance requirements while allowing free, non-binding stroking of the valve element. This includes two aspects, one being a swivel-pilot construction, and the other being a soft metallic coating which conforms quickly to the actual alignment of parts to provide concentricity. Another feature of the invention is the combination of the warning and proportioning and proportioning override features with a metering valve in the other circuit.

IN THE DRAWING

The single FIGURE illustrates mechanism embodying the invention, with parts in section, and with a schematic showing of the brake system and warning circuits.

DESCRIPTION OF THE PREFERRED EMBODIMENT

The housing 10 is provided with a through bore 12 having several shoulders thereon and divided into several chambers as will be described. The front brake pressure inlet 14 connects with a left center portion of the bore 12, and outlets 16 and 18 connect with the left end portion of the bore 12. These outlets are connected to the two front disc brakes 20 and 22 of the vehicle. The rear brake pressure from the master cylinder 24 passes through inlet 26, connected to the right center portion of the bore 12, and the outlet 28 at the right end of the bore 12 is connected to the rear brakes 30 and 32.

The left portion 34 of the assembly comprises the metering section, which prevents initial front disc brake pressure buildup until the rear brake shoes contact the drums. The pressure thus held off is then admitted to the front brakes at higher input pressures.

The center portion 36 of the assembly comprises a warning section including a latch-type hydraulic reset warning switch assembly and actuator. The switch assembly 38 is threaded into a housing opening 40 so that the switch plunger 42 extends into the center portion of the housing bore 12.

The right portion 44 of the assembly includes a proportioner section comprising a rear brake pressure proportioner and a proportioner override arrangement.

METERING SECTION

Front brake pressure enters inlet 14 and chamber 46, provided in a part of bore 12. The left side of chamber 46 is defined by the vale pin stop 48. This stop is cup shaped, and is provided with one or more openings 50 through which chamber 46 is connected to the chamber 52 inside the cup. The metering valve pin 54 has a smooth head 56 positioned in chamber 52 and separated by a groove 58 from a knurled pin section 60. The pin extends leftwardly to a reduced pin section 62 about which diaphragm seal 64 is mounted. The pin land 66 is slidably mounted in a bore 68 formed through the valve plug 70. The pin reduced end 72 extends outwardly through the valve plug and is covered by the metering valve boot 74. The valve plug 70 is held in the left end of the housing bore by retainer ring 76.

The chamber 78 between diaphragm seal 64 and the valve pin stop 48 contains the metering valve 80. The outer portion 82 of valve 80 acts as a valve which sealingly engages a valve seat 84 formed by the valve pin stop 48 and a shoulder 86 of bore 12. The annular portion of metering valve 80 has an axially extending annular section or lip 88 which (in the position shown) receives and engages the outer periphery of the pin knurled land 60. A valve retainer and spring seat 90 presses against the other side of metering valve 80 relative to valve pin stop 48 and is engaged by compression spring 92, which also acts against spring seat 94 and the outer periphery of diaphragm seal 64. The portion of pin 54 intermediate land 60 and section 62 has a groove 96 receiving a spring seat 98. Spring 100 seats against spring seats 94 and 98 and urges pin 54 rightwardly toward engagement by the end of head 56 with pin stop 48. The front brake pressure outlets 16 and 18 connect with chamber 78.

When brake pressure is initially applied, fluid passes through inlet 14, chamber 46, passages 50, chamber 52, and the axially grooved openings formed by the knurled land 60, to chamber 78. This initial pressure is between 0 and 30 psi. This light initial pressure in chamber 78 is transmitted to the front brakes 20 and 22 and also acts on diaphragm seal 64 to move metering valve pin 54 to the left against spring 100 until the shoulder 102 of the knurled land 60 engages the inner annulus 104 of spring retainer 90. This provides a first stop for the pin 54, at which time the smooth outer periphery of pin head 56 has moved to engage the lip 88 of the metering valve 80, blocking off further flow of fluid from chamber 52 to chamber 78.

Additional inlet pressure must now be built up before additional pressure can be supplied through the valve assembly to the front brakes. This pressure is called the "hold-off" pressure and is controlled by the effective area of the metering valve 80 and the load of spring 92. The "hold-off" pressure may be varied from 60 to 200 psi as required for a particular vehicle.

Continued increase in inlet pressure in chambers 46 and 52 acts on the effective area of the metering valve 80 and the head 56 of the metering valve pin 54 and eventually causes the pin 54, the valve 80, and the spring retainer 90 to move leftwardly against the forces of springs 92 and 100 to open the valve 82 relative to its seat 84. Inlet pressure is then admitted to chamber 78 past the outer periphery of valve seal 80 and acts on diaphragm seal 64 to move pin 54, with retainer 90 and valve 80, further to the left until the pin land 66 engages the shoulder 106 at the left end of bore 68. A transition between the inlet pressure and the pressure to the front brakes takes place as this occurs and this transition is completed at a pressure point called the "blend" pressure. The inlet pressure is thereafter the same as the pressure passing through outlets 16 and 18 to the front brakes. The blend pressure is controlled by the relationship of the effective area of diaphragm seal 64 and the spring load of springs 92 and 100.

Upon release of inlet pressure, pin 54 gradually moves rightwardly as do valve spring retainer 90 and valve 80, until the metering valve 80 again has its outer periphery 82 seating against the valve seat 84. As further release of inlet pressure occurs, the lip 88 of the metering valve lifts to allow pressure to flow from chamber 78 to chamber 52. This allows release of pressure to the front brakes 20 and 22 at a very small pressure differential. Upon complete release, pin 54 assumes the position shown so that chamber 78 is again connected to chamber 52 through the grooves formed by the knurls of pin land 60. These knurls and grooves provide free flow of brake fluid for compensation of change in volume of the hydraulic circuit due to thermal changes.

WARNING SECTION

The switch assembly 38 has a housing 108 threaded into an appropriate opening 40 in housing 10. A terminal 110 extends outwardly and is separated from housing 108 by insulator 112 and O-ring 114. Terminal 110 is electrically connected through a suitable switch 116 to an indicator 118 and a source of electrical energy schematically illustrated as battery 120. Indicator 118 may be a light, bell, or horn, by way of example. The inner end of terminal 110 is formed as a pin 122 around which steel collar 124 is received. Collar 124 extends downwardly beyond the end of pin 122. The upper end of plunger 42 is formed as a somewhat similar but slightly larger diameter pin 126 which is normally separated from pin 122 and is movable upwardly to engage collar 124 to close the switch contacts. A spring 128 urges terminal 110 with its collar 124 upwardly by acting through an insulated spring seat 130 while urging plunger 42 downwardly. A plastic insulator 132 about a reduced portion of the plunger pin 126 guides pin 126 in collar 124 and insulates them when the switch is open. Plunger 42 is grounded through assembly housing 10 as schematically illustrated by ground wire 134. The lower end of plunger 42 extends into the center portion of the bore 12 formed in housing 10.

The switch piston assembly 136, including piston 138, is positioned in the center portion of the bore 12 of housing 10 so that the piston grooved center section 140 is normally aligned with plunger 42, the plunger end being held in groove 140 by the force of spring 128. The groove has beveled sides 142 and 144 leading to shoulders 146, 148 and so positioned that movement of piston assembly 136 to either a leftwardly or rightwardly direction causes plunger 42 to be cammed upwardly to close contacts 124 and 126. The contacts are held in the closed position by engagement of the lower end of plunger 42 on one of the shoulders. The slightly larger lands 150 and 152 of shoulders 146 and 148 aid in holding plunger 42 on a shoulder once it has been positioned there.

The right end of piston 138 is formed as an enlarged land 154 provided with a seal 156. Land 154 and seal 156 guide and seal piston 138 in the right center position of bore 12. The left end of piston 138 has a land 158 of the same diameter as land 154 and guides piston 138 in the left center portion of bore 12. The left outer end 160 of the piston assembly is formed as a land 162 of smaller diameter than lands 154 and 158. A seal retainer 164 slidably fits over land 162 and has a smaller inner diameter than the diameter of lands 154 and 158, but a larger outer diameter than the diameter of those lands. For this purpose, the housing bore 12 is provided with a shoulder 166 against which retainer 164 normally is abutted. An O-ring seal 168 is received about the land 158 intermediate the retainer 164 and another sleeve-like retainer 170. Retainer 170 has the same inner and outer diameters as retainer 164. Retainers 164 and 170 and the seal 168 may move relative to piston 138 under certain conditions.

The left end 160 of piston 138 and one side of retainer 170 are exposed to master cylinder front brake pressure in chamber 46. The right end 154 of piston 138 is exposed to master cylinder rear brake pressure in chamber 172. Rear brake pressure inlet 26 is connected to the master cylinder 24 and to chamber 172.

The piston assembly 136 also has a recess or bore 174 formed in the right end of piston 138 and opening into chamber 172. Spring 176 fits in the inner end of bore 174 and seats on a guide 178 which is slidably received in bore 174. Guide 178 may be in the form of a grooved land, or may be a fluted member. In either case, it is secured to or formed as a part of a valve element of the proportioner section 44 described below in detail. An inwardly lanced tab 180 adjacent the open end of bore 174 provides a stop for guide 178 such that sufficient leftward movement of piston 138 will cause tab 180 to engage guide 178 and thereafter move the guide leftwardly with further leftward movement of piston 138. This provides a lost-motion connection discussed below.

So long as substantially normal front and rear brake pressures exist in chambers 46 and 172, the switch piston assembly 136 will be in the position shown. Should front brake pressure loss occur while rear brake pressure remains, the higher pressure in chamber 172 acting on the right end of piston 138 will move the piston assembly 136 leftwardly. Land 158 will cause seal retainers 164 and 170, as well as seal 168, to also move leftwardly with piston 138. This movement will move plunger 42 upwardly and over land 152 until it rests on shoulder 148. This will hold switch contacts 124 and 126 engaged, holding the warning circuit in the energized condition. When, for example, switch 116 is the vehicle ignition switch, indicator 118 will be energized so long as the ignition switch is closed and piston 138 remains in the actuated condition.

The warning section is hydraulically reset when the front brake system is repaired and front brake pressure is again applied in chamber 46. This pressure will act against the larger combined effective areas of seal retainer 170 and the left end 160 of piston 138 (as compared to the effective area of the right land of piston 138) to move piston assembly 136 rightwardly until the seal retainer 164 again engages the shoulder 166. This recenters the piston assembly and disengages the warning switch contacts 124 and 126.

Should rear brake pressure fall substantially below front brake pressure, the piston 138 moves rightwardly, with plunger 42 moving upwardly over land 150 and resting on shoulder 146. When the rear rake pressure is again available in chamber 172, the larger effective area of the right end of piston 138 relative to the effective area of the piston left end 160 permits rear brake pressure to move the piston 133 to the left until its land 158 engages retainer 164. Thus, the position shown is again assumed.

PROPORTIONER SECTION

The right end of the bore 12 through housing 10 is formed to provide chamber 172 and a larger chamber 182. The shoulder 184 separating the two chambers receives the annular flanged seal support member 186. The proportioning valve cap member 188 is threaded into chamber 182 and abuts against seal support 186 to hold it in place. Valve cap 188 has outlet 28 formed axially therein and has a chamber 190 in its inner end to which the outlet 28 is connected. The proportioning valve piston 192 is reciprocally received in chamber 190 and extends into chamber 172. It passes through seal support 186, as well as the V-block seal 194. Seal 194 faces chamber 172 and is supported by seal support 186.

The center flange 196 of piston 192 is piloted on the chamber wall 198 of chamber 190. Thus, chamber wall 198 is a bore and piloting surface. The reduced diameter outer end 200 of piston 192 provides a mounting for V-block seal 202, which faces outwardly toward chamber 190 and is backed up by flange 196. A piston stop 204 is mounted in the end of chamber 190 adjacent outlet 28. Piston stop 204 has one or more openings or radial slots 206 which provide for fluid connection between chamber 190 and outlet 28. The inner end 208 of piston 192 receives spring retainer 210 to provide a seat for compression spring 212 and spring guide 214. Thus, in the assembled position, spring 212 urges piston 192 to the right so that it abuts piston stop 204.

The piston stop 204 is formed to provide openings 206 of sufficient area so that the piston through-bore 216 is always fluid connected with chamber 190 and outlet 28 in unrestricted flow relation. The end of bore 216 is formed at inner piston end 208 to provide a valve seat 218. Valve seat 218 is one valve element of the proportioning valve, and is the element that moves during the usual proportioning action. The valve stem 220 extends through piston 192 so that its outer end 222 normally abuts piston stop 204. A center portion of valve stem 220 is provided with a valve element 224 which mates with valve seat 218. The part of valve stem 220 within bore 216 is sufficiently smaller than the bore to permit relatively unrestricted flow therethrough between chambers 172 and 190, subject to the valving action of valve element 224 and valve seat 218. The inner end 226 of valve stem 220 extends into piston bore 174 and has guide 178 formed thereon or secured thereto by suitable means. Thus, the lost motion connection is provided between valve stem 220 and the switch piston 138.

The mechanism is in the position illustrated before brake pressure is applied. Upon application of master cylinder rear brake pressure through inlet 26 and into chamber 172, pressurized fluid passes between valve element 224 and valve seat 218, through bore 216 and openings 206, and into chamber 190. It also passes through openings 206 into outlet 28. As the pressure builds up, it acts on the piston differential area defined by the area of piston 192 exposed to chamber 190 relative to the piston area exposed to chamber 172 so as to move piston 192 to the left against the force of spring 212. Since pressure is being built up substantially equally and normally in the front and rear brake supply lines, the hydraulic forces do not move the switch piston 138. As the rear brake pressure continues to build up, piston valves seat 218 moves toward valve element 224. This causes a reduction in output pressure to the rear brakes equivalent to the ratio of the differential areas of piston 192. The valve element 224 is axially positioned for this proportioning function by its stem. During brake release the master cylinder acts to decrease the pressure in inlet 26 and chamber 172. As this pressure decreases, the brake apply pressure in outlet 28 and chamber 190 acts to move the proportioning valve piston 192 leftwardly against spring 212 as seen in the drawing, until the center flange 196 engages the seal support and piston stop member 186. This results in an initial decrease in the pressure in chamber 190 due to chamber expansion as a result of piston displacement. Momentarily, during the decrease in supply pressure, the valve seat 218 functions in relation to normally fixed valve 224 to reverse-proportion the pressure. However, due to the small amount of movement available to piston 192, valve seat 218 maintains engagement with valve 224 as the piston moves leftwardly, moving the valve 224 with it against the relatively light force of lost-motion spring 176. When the brake supply pressure in chamber 172 has decreased sufficiently, valve 224 will open relative to valve seat 218, further relieving the brake apply pressure in chamber 190. As the pressure in chamber 190 decreases due to fluid flow through the open valve, the force exerted on piston 192 by the pressure in this chamber becomes insufficient to oppose the force of spring 212, which was further compressed by the leftward movement of piston 192. The unbalanced forces then acting on piston 192 cause it to move sharply to the right until it engages piston stop 204. Since this sharp movement would otherwise result in an audible click-type noise, which may be objectionable, a rubberlike snubber 227 is provided on the right end of piston 192 so that the snubber engages piston stop 204 prior to metal-to-metal contact being made by the end of the piston against the piston stop. The snubber is then compressed by the force of spring 212 so that metal-to-metal contact may be attained. This prevents the full compressive loading of the spring 212 from being taken by the snubber at all times when piston 192 is positioned against the piston stop 204. Since the force of spring 176 is light, and the lost-motion mechanism is provided, valve 224 and its stem 220 can move for some distance toward switch piston assembly 136 during the brake release action above described without exerting any significant force thereon. When valve 224 opens relative to seat 218 during brake release, under influence of the relatively high pressure in chamber 190, the proportioning valve operates to permit a quick and relatively unrestricted return of brake fluid to the master cylinder. As shown in the drawing, when the proportioning valve is at rest, valve 224 and valve seat 218 are not engaged, therefore maintaining fluid communication between chambers 172 and 190.

Should the front brake pressure fall substantially below the rear brake pressure, additional work must be done by the rear brakes, and this requires additional rear brake pressure. To get the maximum braking effort under this condition and yet keep brake pedal effort as low as possible, the action of the proportioner is overridden and held out of the system. Thus, when switch piston 138 moves leftwardly due to front brake pressure loss, the guide 178 is engaged by the tab 180 of piston 138 and pulls the valve stem 220 leftwardly to open valve element 224 well away from its seat 218. This forcible removal of the valve element 224 from its proportioning position allows full rear brake pressure to pass from chamber 172 through bore 216 to outlet 28. The leftward movement of valve piston 192 is limited by the engagement of the piston flange 196 with the outer side of seal support member 186. Thus, valve seat 218 cannot move leftwardly a sufficient distance to reinstate the proportioning action. By connecting the normally fixed valve element 224, through its valve stem 220 and the lost motion connection, to the switch piston 138, so that it functions as a part of the override mechanism instead of so connecting the normally movable valve element 218, the movable valve element is allowed to function in its normal proportioning mode so that the normal proportioning action is completely unaffected by the presence of the lost motion connection.

A vent groove 228 allows sufficient expansion of chamber 182 past V-block seal 230 for proper proportioner function. Should either seal 194 or 202 leak brake fluid to chamber 182, collection of fluid will take place in groove 228. However, seal 230 will permit the release of excess fluid leakage collection to allow proper proportioner function. The seal 230 can also function as a vacuum bleeding seal, allowing vacuum bleeding of new cars on assembly lines.

In the proportioning section 44 it is an important feature of the invention that the proportioning valve piston 192 be aligned for free stroking movement in the valve cap member 188 as well as in the seal support member 186. The bore and pilot surface 198 of the valve cap member 188 is engaged in a sliding and piloting relationship by the outer peripheral surface of the center flange 196 of piston 192. The piloting surface 232 formed by the inner peripheral surface of seal support member 186 is also slidably engaged in a piloting relation with piston 192. In turn, the piloting surface 234 of seal support member 186 engages the cylinder wall portion of bore 12 forming chamber 172 and adjacent shoulder 184.

In order for all of the piloting surfaces to be correctly related, a close tolerance relationship is also required for the threaded area between valve cap member 188 and the threaded portion of bore 12 formed in housing 10. In the usual construction, this would therefore require the close coordination of four piloting surfaces which would be so aligned as to prevent any binding of piston 192 in its axial movement. In order to alleviate the extremely close tolerance required for such an arrangement, the seal support member 186 has a short bearing length forming the piloting surface 232. This is provided by the undercut 236.

The axially short length of piloting surface 232 allows for a slight swiveling action to obtain alignment relative to that piloting surface which would not be obtainable should the seal support member have an axially extending piloting surface which would prevent any such minute swiveling action. Furthermore, a soft metallic plating provided on the piloting surface 232 prior to assembly permits a further alignment of the final piloting surface resulting in a better free stroking action. During installation of the valve piston 192, the soft metallic plating deforms and quickly wears away in a stroke or two so that the final alignment of piloting surface 232 conforms more specifically to the alignment of the piston center flange 196 on the piloting surface 198. It has been determined that the soft metallic plating should have a minimum thickness of 0.0002 inch and a maximum thickness of 0.0004 inch. Plating thicknesses less than the minimum are insufficient to compensate for a misalignment occurring within the desired tolerance level, and those greater than the maximum thickness are found to wear away further and result in an overly loose piloting fitting, creating problems of an overly loose valve piston 192. In the preferred embodiment, the plating is made of tin. However, it can also be of other suitable soft metallic material, such as lead or cadmium. It must have the soft characteristic so that it allows conformation of alignment quickly and accurately with the installation stroke of piston 192 or only a stroke or two thereafter.

What is claimed is:

1. In a brake system for a vehicle having first and second separate brake sub-systems:

brake system pressure loss indicating means for providing a signal in response to pressure loss in either of said brake sub-systems, said indicating means comprising pressure responsive means having first and second opposed effective areas respectively responsive to the pressures in said first and second brake sub-systems, and normally being in a first condition in response to the pressures in both sub-systems being approximately normal, and being actuatable to a second condition in response to pressure loss in either but only one sub-system below the approximately normal sub-system pressures, and signal means for providing said signal in response to said pressure responsive means being actuated to said second condition;

proportioning valve means in series with one of said first and second brake sub-systems with the input to said proportioning valve means being in fluid pressure communication with one of said first and second opposed effective areas, said proportioning valve means having a normally fixed valve element provided as a part of a vale stem and an annular valve element receiving said valve stem therethrough in radially spaced relation to define an annular flow path and movable relative to said normally fixed valve element to proportion brake apply pressure through said annular valve element in said one brake sub-system in relation to pressure supplied to the input to said proportioning valve means through said one brake sub-system; and override means actuatable to override said proportioning valve means and including said normally fixed valve element and valve stem of said proportioning valve means and lost motion means, formed of a recessed end of said pressure responsive means and a compression spring and a head on said valve stem in said recessed end and stop means adjacent the opposite end of said annular valve element and normally engaged by the end of said valve stem to define the normally fixed position of said normally fixed valve element, and being actuatable to move said valve stem out of engagement with said stop means and said normally fixed valve element beyond the range of movement of said annular valve element in response to actuation of said pressure responsive means to said second condition in response to pressure loss only in the other of said first and second brake sub-systems, and latching means so holding said pressure responsive means and said valve stem and said normally fixed valve element and subject to normal brake actuating pressures in said first and second sub-systems to release said pressure responsive means for return thereof to said first condition.

2. The mechanism of claim 1, said override means lost motion means including linkage connecting said pressure responsive means and said proportioning valve means normally fixed valve element and acting to allow a predetermined initial amount of movement of said pressure responsive means while permitting proportioning of pressure when the pressures in said first and second brake sub-systems are approximately normal, and acting only after said predetermined initial amount of movement of said pressure responsive means to an actuating position in response to pressure loss in the other of said first and second brake sub-systems to remove said normally fixed valve element to an open valve position permitting pressure in said one brake system to pass through said proportioning valve means without being proportioned.

3. The mechanism of claim 1 further comprising metering valve means in series with the other of said first and second brake sub-systems with the input to said metering valve means being in fluid pressure communication with the other of said first and second piston effective areas.

4. In a brake system for a vehicle having first and second separate brake sub-systems:

brake system pressure loss indicating means for providing a signal in response to pressure loss in either of said brake sub-systems, said indicating means comprising pressure responsive means having first and second opposed effective areas respectively responsive to the pressures in said first and second brake sub-systems, and normally being in a first condition in response to the pressures in both sub-systems being approximately normal, and being moved through a predetermined amount of initial movement and therebeyond to a second condition in response to pressure loss in either but only one sub-system below the approximately normal sub-system pressures; and signal means for providing said signal in response to said pressure responsive means being actuated to said second condition;

proportioning valve means in series with said second brake sub-system with the input to said proportioning valve means being in fluid pressure communication with said second opposed effective area of said pressure responsive means, said proportioning valve means having a first valve element normally having a fixed position and a second valve element normally movable relative to said first valve element in response to the pressure in said second brake sub-system at the input to said proportioning valve means to proportion pressure at the output of said proportioning valve means; and proportioning valve means override means including said first valve element and lost motion connecting means received within and including one end of said pressure responsive means and connecting said first valve element and said pressure responsive means for movement of said first valve element in a direction away from said second valve element when there is a pressure loss only in said first brake sub-system which is sufficient to move said pressure responsive means beyond said predetermined amount of initial movement to override the proportioning action of said proportioning valve means and permit full transmission of second brake sub-system pressure through said proportioning valve means between said valve elements.

5. In a brake system for a vehicle having first and second separate brake sub-systems:

brake system pressure loss indicating means for providing a signal in response to pressure loss in either of said brake sub-systems, said indicating means comprising pressure responsive means having first and second opposed effective areas respectively responsive to the pressures in said first and second brake sub-systems, and normally being in a first condition in response to the pressures in both sub-systems being approximately normal, and being actuatable to a second condition in response to pressure loss in either but only one sub-system below the approximately normal sub-system pressures, and signal means for providing said signal in response to said pressure responsive means being actuated to said second condition;

and proportioning valve means in series with one of said first and second brake sub-systems with the input to said proportioning valve means being in fluid pressure communication with one of said first and second opposed effective areas, said proportioning valve means including a housing having a bore therein, an annular seal support member and an annular valve cap member mounted in said housing bore, said members and said housing bore being substantially axially aligned and said members receiving therein a pressure responsive movable proportioning valve element in reciprocably piloted relation, said annular valve cap member having the piloting surface thereof extending axially a distance greater than the allowable movement of said valve element and said annular seal support member having an axially extending piloting surface of said valve element thereat for bind-free movement of said valve element relative to the piloting surfaces of said members.

6. The mechanism of claim 5, said other annular seal support member piloting surface being coated prior to assembly with a soft metallic plating, of tin, lead or cadmium by way of example, to a radial thickness at least equal to the tolerance allowable for misalignment of said piloting surfaces, said plating being sufficiently soft to wear with a few strokes of said valve element to establish a close alignment and prevent valve binding.

7. The mechanism of claim 6, said soft metallic plating radial thickness being at least 0.0002 inch.

8. The mechanism of claim 6, said soft metallic plating radial thickness being in the range of 0.0002 inch to 0.0004 inch.

9. In a brake system for a vehicle having first and second separate hydraulic brake sub-systems:

a proportioning valve assembly in one of said brake sub-systems, said valve assembly having a brake supply pressure inlet and a brake apply pressure outlet and a bore connecting said inlet and said outlet, a proportioning piston mounted in said bore for limited reciprocal movement, a first stop member mounted in said bore and limiting movement of said piston toward said inlet, a second stop member mounted in said bore and limiting movement of said piston toward said outlet, a first proportioning valve element formed on said piston, a second proportioning valve element reciprocably mounted in said bore and having a normally fixed position defined by one of said stop members and cooperating with said first proportioning valve element to control fluid flow and pressure transmittal between said inlet and said outlet, first means yieldably urging said piston toward and into engagement with said second stop member, second means yieldably urging said second proportioning valve element toward said first proportioning valve element, a snubbing member on one end of said piston engaging said second stop member, said piston having opposed differential areas with the smaller area being exposed to brake supply pressure at said inlet and the larger area being exposed to brake apply pressure at said outlet to generate a force opposing said first yieldable means and at a predetermined brake supply pressure moving said piston and said first proportioning valve element into proportioning relation with said second proportioning valve element to proportion the brake apply pressure relative to the brake supply pressure, the brake supply pressure decreasing upon brake release and the brake apply pressure then acting on said piston against said first yieldable means to move said piston and said proportioning valve elements toward said inlet and initially decrease said brake apply pressure by piston displacement until said piston engages said first stop member, said second proportioning valve element being moved by the higher brake apply pressure against the decreased brake supply pressure and the force of said second yieldable means to move away from said first proportioning valve element to permit brake fluid flow from said outlet to said inlet and further decrease of brake apply pressure, said first yieldable means then overcoming the force generated by the decreasing brake apply pressure acting on said piston larger differential area and moving said piston away from said first stop member toward said second stop member, said snubbing member engaging said second stop member to cushion the engagement of said piston with said second stop member; and said second yieldable means moving said second proportioning valve element to its normally fixed position spaced from said first proportioning valve element to maintain fluid communication between said inlet and said outlet during the remainder of the brake release cycle and the initial part of the next brake apply cycle.

* * * * *